United States Patent [19]

Montano

[11] Patent Number: 5,018,374
[45] Date of Patent: May 28, 1991

[54] BICYCLE LOCK

[76] Inventor: Venses J. Montano, 1110 San Felipe, Santa Fe, N. Mex. 87501

[21] Appl. No.: 403,493

[22] Filed: Sep. 6, 1989

[51] Int. Cl.⁵ .............................................. E05B 71/00
[52] U.S. Cl. ........................................... 70/233; 70/58
[58] Field of Search ...................... 70/233, 14, 57, 58, 70/225, 226, 227, 234, 235, 236

[56] References Cited

U.S. PATENT DOCUMENTS 3,747,376  7/1973  White ..................................... 70/233
4,180,998  1/1980  Hellman ................................. 70/233

FOREIGN PATENT DOCUMENTS 2503077  10/1982  France ................................... 70/233

Primary Examiner—Robert L. Wolfe

[57] ABSTRACT

This invention is a bicycle lock, comprising a two-way horizontal swivel bicycle frame clamp which is secured by a nut and bolt to the bicycle frame. The clamp wraps around the bicycle frame just below the seat post and is secured in place by said nut and bolt. The lock also includes a 90° pivot rod, one end of which is connected to said clamp and acts as a hinge, allowing the unit to move back and forth in a horizontal direction. Also included is a two-way cylinder which is attached to said pivot rod, permitting the unit to move back and forth in a vertical direction similar to the movement of a hinge. There are also flat metal tracks such that one end of one track is attached to said cylinder and the other end is connected to the other tracks, one after another in line, and held together by means of rivets. The rivets slide along the inside of the tracks, acting as a swivel and also allowing the tracks to extend or retract.

1 Claim, 2 Drawing Sheets

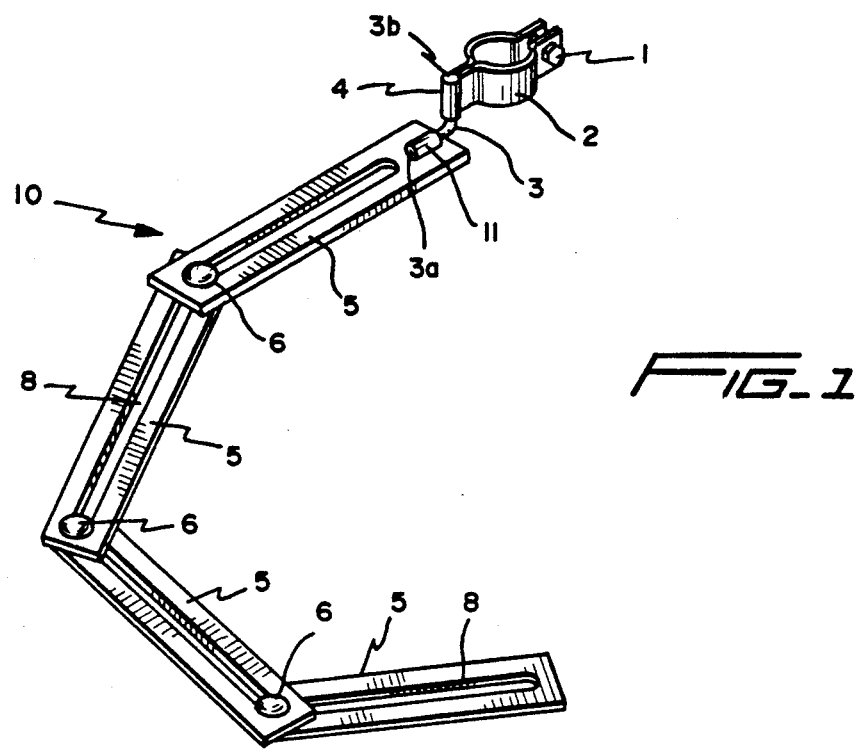
FIG_1
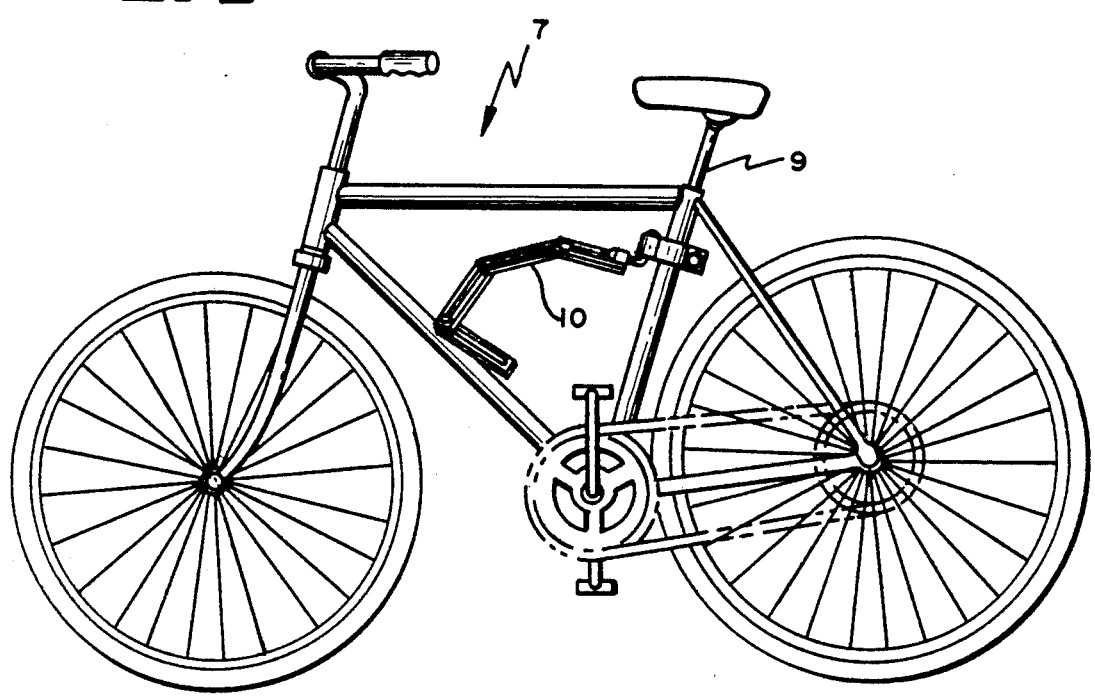
FIG_2

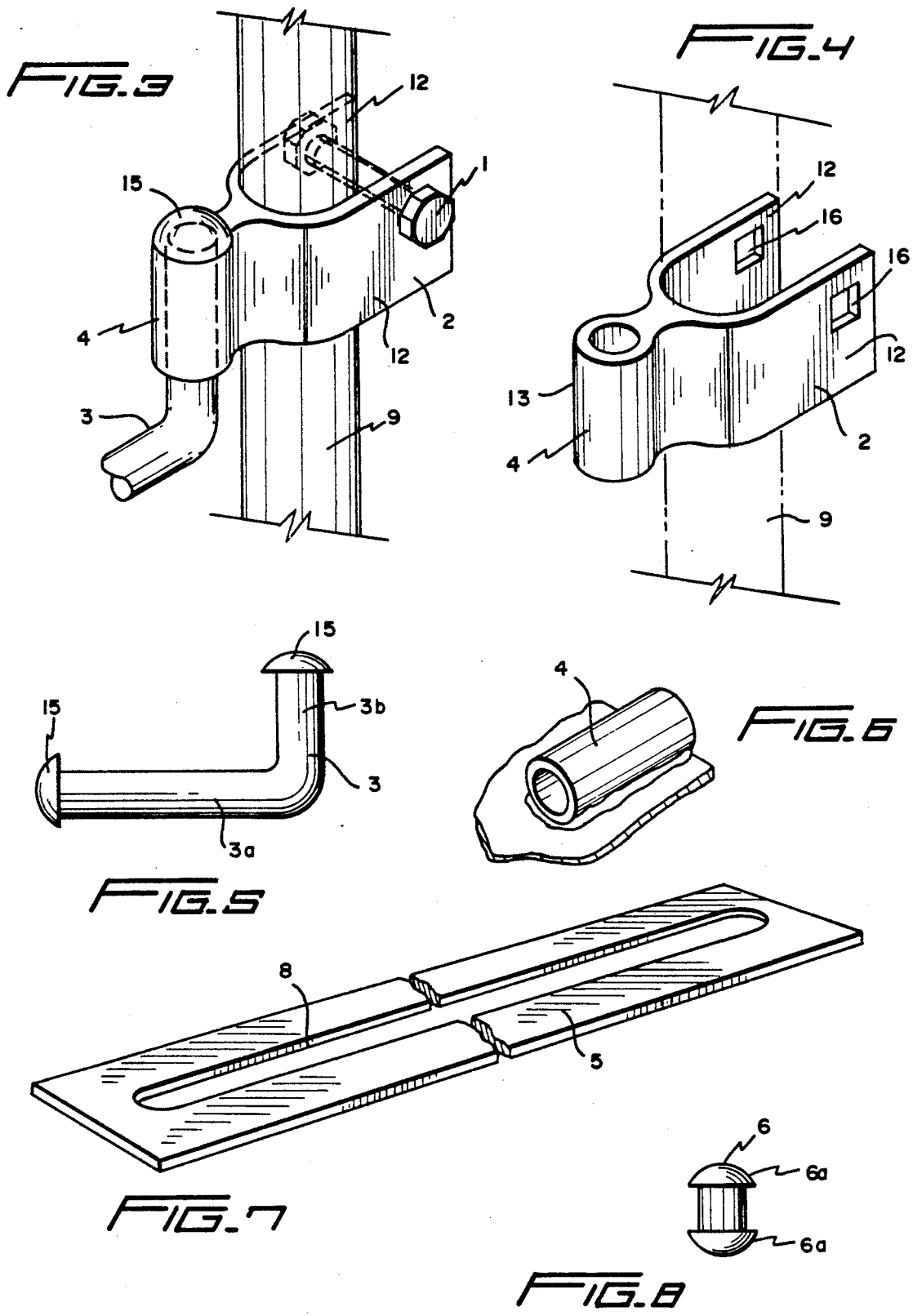

BICYCLE LOCK

FIELD OF THE INVENTION

This invention relates to the field of bicycle locks.

BACKGROUND OF THE INVENTION

The prior art discloses many different types of bicycle locks. However, none of these have proved to be entirely satisfactory. These earlier locks are mostly limited in their movements in that they either cannot swivel, or are limited to a few directions of swiveling. The present invention has the advantage that it will swivel in all directions, making it possible to lock the bicycle to any stationary object regardless of the shape or size of the same, and regardless of whether it has a vertical or horizontal orientation.

SUMMARY OF THE INVENTION

The principal object of this invention is to provide a new and improved bicycle lock capable of swiveling in all directions which provides easy attachment to stationary objects of any shape or size.

To this end, the bicycle lock is a chain comprised of a plurality of connected, elongated slotted links serially joined to one another by a fastener of a rivet configuration permitting the links to slide and pivot relative to each other. A coupling member is provided on one of the links for securing the same to a part of a bicycle frame for removably securing the same thereto. To lock the bicycle to a stationary object, the free end of the chain is grasped with the one end secured to the bicycle frame and is wrapped about the object and due to the slidable and pivoting characteristics of the links, the same is capable of closely engaging the object notwithstanding the shape thereof. After this, one slot of one of the links is positioned over and aligned with the slot of another and a padlock or other security device is passed therethrough for locking the chain and thereby the bicycle in place.

BRIEF DESCRIPTION OF THE DRAWINGS

Further objects will be appreciated from the following detailed description of the invention.

The invention may be more readily understood by studying the drawings.

Referring generally to the various figures of the drawings,

FIG. 1 is a plan view, partly in perspective, of the entire lock.

FIG. 2 is a view in perspective of the lock attached to the bicycle.

FIG. 3 is a side view, partly in perspective, showing the bolt and nut attaching the clamp to the bicycle frame.

FIG. 4 is a side view of the two-way horizontal bicycle frame clamp wrapped around the bicycle frame.

FIG. 5 is a side view of the pivot rod.

FIG. 6 is a side view, partly in perspective, of the two-way vertical swivel cylinder.

FIG. 7 is a plan view, partly in perspective, of one of the tracks.

FIG. 8 is a side view of the rivet.

Referring to FIG. 1 of the drawings, the bicycle lock of the present invention is designated generally at 10 and is seen to be comprised of a collapsible chain formed from a plurality of interconnected elongated links or tracks 5, with each having a slot 8, formed therein with a captive type fastener 6 disposed therein. Fastener 6, as seen in FIG. 8, is of the rivet type having opposing heads 6a, 6a for captively maintaining the fastener in the adjacent tracks and thereby adjustably and pivotally connecting one link to the other permitting the tracks to selectively extend and contract from a stacked storage position to a use position, respectively.

Chain 10 further includes a coupling member 2 which is secured to one of the endmost links 5 and is used to connect the chain to the article to be protected. The coupling member 2 as further seen in FIGS. 3 and 4 is U-shaped in configuration and includes spaced legs 12, 12 joined together at a thickened end 13 having a cylindrical opening 4 for receiving a hinge pin 3. The pin 3 is "L shaped", see FIG. 5, and has one leg 3a disposed in a cooperatively shaped housing 11 positioned on link 5 and its other leg 3b disposed in opening 4 with heads 15, 15 maintaining the legs therein. This mounting permits legs 3a, 3a to rotate within their respective housings both in a vertical and horizontal plane, acting as a hinge, thereby adding flexibility and maneuverability to the chain in its usage.

To lock a portable device such as a bicycle 7 of FIG. 2 to a stationary support, it is only necessary to place the legs 12, 12 of the coupling member 2 about the bike post housing 9 and lock the same thereto by placing a nut and bolt fastener 1 through the aligned openings 16, 16. Chain 10 is then extended from its stacked position with the free end thereof wrapped about the support and positioned over one of the remaining links with at least a portion of the openings 8 being aligned with one another. A padlock or other security device is passed therethrough for locking the chain and thereby the bicycle to the support. It is then apparent that the sliding movement of the fasteners 6 within the links 5 and the swivel mounting of the hinge pin 3 permits the chain 10 to accommodate itself to a stationary support surface notwithstanding the shape thereof.

It will be appreciated that many variations can be made from the embodiments shown herein without departing from the scope of the invention. I intend therefore to be bound only by the following patent claims.

I claim:

1. A locking device for securing a bicycle or the like to a stationary support comprising a chain, said chain being formed from a plurality of elongated links, each of said links having a slot formed therein, a fastener slidably and rotatably disposed in each of said slots serially connecting one link to the other, a coupling means, hinge means connecting said coupling means to one of said links permitting universal movement of the same relative to said link, whereby when the coupling means is secured to said bicycle or the like the links are adapted to be slidably and rotatably disposed relative to one another when wrapped about said stationary support to snugly engage the same, and lock means adapted to be inserted through overlapped slots for locking the chain and thereby the bicycly or the like in place.

* * * * *